D. CALMUS.
DEVICE FOR PROTECTING THREADS ON PIPES DURING TRANSPORTATION.
No. 184,335.            Patented Nov. 14, 1876.
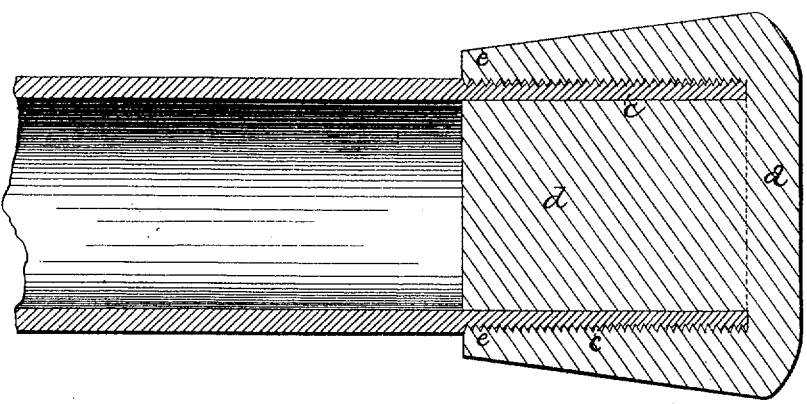
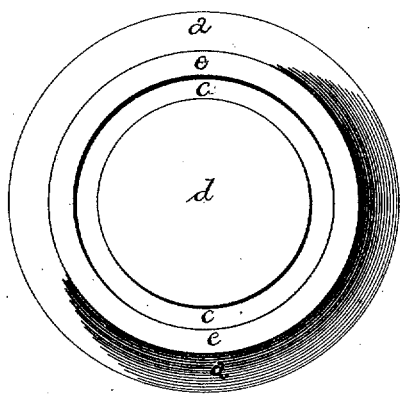
WITNESSES:
Wm Garner
F. M. Burnham
INVENTOR:
Daniel Calmus
Per F. A. Lehmann, atty.
THE GRAPHIC CO. N.Y.

UNITED STATES PATENT OFFICE.

DANIEL CALMUS, OF PITTSBURG, PENNSYLVANIA.

IMPROVEMENT IN DEVICES FOR PROTECTING THREADS ON PIPES DURING TRANSPORTATION.

Specification forming part of Letters Patent No. 184,335, dated November 14, 1876; application filed October 11, 1876.

*To all whom it may concern:*

Be it known that I, DANIEL CALMUS, of Pittsburg, in the county of Allegheny and State of Pennsylvania, have invented certain new and useful Improvements in Devices for the Protection of Threads on Pipes During Transportation; and I do hereby declare the following to be a full, clear, and exact description of the invention, such as will enable others skilled in the art to which it pertains to make and use it, reference being had to the accompanying drawings, which form part of this specification.

My invention relates to an improvement in devices for the protection of the threads on pipes during transportation; and it consists in a wooden plug, that is preferably made largest at its outer end, and which is so reamed out on its smaller end that the central part or core enters the inside of the pipe, while the outer part or shell of the block extends down along the outside of the pipe along the screw-thread, all of which will be more fully set forth hereinafter.

The accompanying drawings represent my invention.

$a$ represents a wooden block, which is preferably made tapering, as shown, so as to be largest at its outer end, and thus keep the end of the pipe to which it is applied out of contact with hard substances. In the smaller end of the block is cut a deep round recess, $c$, which divides the shell for any desired length into a central core, $d$, that enters the inside of the end of the pipe, and the shell $e$, which passes down along the outside of the pipe, so as to protect the screw-thread cut on the end. The block is screwed upon the end of the pipe, as shown, the shell being made to protect the thread from rust and being battered while being transported, while the core serves to keep the block firmly in position, even if the shell, from rough usage, should be broken off.

Heretofore nothing but a big-headed block, that is driven into the ends of the pipe, has been used; but this affords no protection whatever to the threads from rust, while it so poorly protects the screw from being battered that very frequently the thread has to be re-cut when the pipe reaches its destination.

By means of the shell the entire thread is protected from injuries of all kinds, and the pipes can be transported, with perfect safety, any desired distance.

If desired, the form of the block may be somewhat altered without departing from the spirit of my invention.

Having thus described my invention, I claim—

1. A block for the protection of the ends of pipes during transportation, that is provided with a shell for protecting the thread on the pipe, substantially as shown.

2. The block $a$, having the annular recess $c$, core $d$, and shell $e$, substantially as specified.

In testimony that I claim the foregoing I have hereunto set my hand this 2d day of October, 1876.

DANIEL CALMUS.

Witnesses:
WILLIAM M. CROFT,
MORGAN T. LEWIS.